(12) United States Patent
Vaidya et al.

(10) Patent No.: US 11,285,755 B2
(45) Date of Patent: Mar. 29, 2022

(54) TOPCOAT WITH MATTE SURFACE FINISH

(71) Applicant: ENTRUST CORPORATION, Shakopee, MN (US)

(72) Inventors: Utpal Vaidya, Maple Grove, MN (US); Roman Knipp, Shafer, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 1359 days.

(21) Appl. No.: 14/875,126

(22) Filed: Oct. 5, 2015

(65) Prior Publication Data

US 2016/0096394 A1 Apr. 7, 2016

Related U.S. Application Data

(60) Provisional application No. 62/059,570, filed on Oct. 3, 2014.

(51) Int. Cl.
*B42D 25/36* (2014.01)
*B42D 25/324* (2014.01)
(Continued)

(52) U.S. Cl.
CPC ............ *B42D 25/36* (2014.10); *B05D 3/067* (2013.01); *B32B 3/30* (2013.01); *B32B 27/08* (2013.01);
(Continued)

(58) Field of Classification Search
CPC .. B42D 25/324; B42D 25/41; B42D 2033/24; B42D 25/00; B42D 25/23; B42D 25/24; B42D 25/30; B42D 25/425; B32B 37/025; B32B 2425/00; B32B 2038/0076; B65H 37/007; B29C 2059/023; B29C 2059/022;
(Continued)

(56) References Cited

U.S. PATENT DOCUMENTS 5,693,405 A 12/1997 Harvie et al.
6,001,893 A * 12/1999 Vaidya ...................... B32B 7/06
430/18

(Continued)

FOREIGN PATENT DOCUMENTS

CN 1738943 A 2/2006
CN 103025523 A 4/2013
(Continued)

OTHER PUBLICATIONS

The extended European Search Report of European patent application No. EP15846787.8, dated Sep. 1, 2017, 12 pages.
(Continued)

*Primary Examiner* — Jasper Saberi
(74) *Attorney, Agent, or Firm* — Hamre, Schumann, Mueller & Larson, P.C.

(57) ABSTRACT

A topcoat layer that has a defined surface structure on an outer surface thereof once the topcoat layer is laminated to a substrate. The surface structure of the topcoat layer provides a matte surface finish to the underlying substrate. Any attempt to alter the substrate or the topcoat layer will result in disruption or destruction of the surface structure of the topcoat layer making such tampering evident. Replication of the surface structure of the topcoat layer by a counterfeiter is also difficult without the appropriate equipment.

13 Claims, 2 Drawing Sheets

(51) Int. Cl.

| | | |
|---|---|---|
| B42D 25/24 | (2014.01) | |
| B42D 25/23 | (2014.01) | |
| B42D 13/00 | (2006.01) | |
| B42D 25/29 | (2014.01) | |
| B42D 25/47 | (2014.01) | |
| B42D 25/46 | (2014.01) | |
| B42D 25/455 | (2014.01) | |
| B32B 27/16 | (2006.01) | |
| B32B 27/08 | (2006.01) | |
| B32B 3/30 | (2006.01) | |
| B32B 37/00 | (2006.01) | |
| B05D 3/06 | (2006.01) | |
| B41M 3/14 | (2006.01) | |
| B42D 25/41 | (2014.01) | |
| B42D 25/00 | (2014.01) | |
| B42D 25/30 | (2014.01) | |
| B65H 37/00 | (2006.01) | |
| B41M 3/00 | (2006.01) | |
| B42D 25/425 | (2014.01) | |
| C09D 135/02 | (2006.01) | |
| B32B 37/26 | (2006.01) | |
| B32B 7/06 | (2019.01) | |

(52) U.S. Cl.
CPC ............ *B32B 27/16* (2013.01); *B32B 37/025* (2013.01); *B41M 3/00* (2013.01); *B41M 3/14* (2013.01); *B42D 13/00* (2013.01); *B42D 25/00* (2014.10); *B42D 25/23* (2014.10); *B42D 25/24* (2014.10); *B42D 25/29* (2014.10); *B42D 25/30* (2014.10); *B42D 25/324* (2014.10); *B42D 25/41* (2014.10); *B42D 25/425* (2014.10); *B42D 25/455* (2014.10); *B42D 25/46* (2014.10); *B42D 25/47* (2014.10); *B65H 37/007* (2013.01); *C09D 135/02* (2013.01); *B32B 7/06* (2013.01); *B32B 2037/268* (2013.01); *B32B 2425/00* (2013.01)

(58) Field of Classification Search
CPC ......... B41M 3/14; B41M 3/00; G03H 1/0244; G03H 1/0011; B05D 3/067
See application file for complete search history.

(56) References Cited

U.S. PATENT DOCUMENTS

| | | | |
|---|---|---|---|
| 6,030,474 A | 2/2000 | Isono et al. | |
| 6,187,129 B1 | 2/2001 | Vaidya et al. | |
| 6,308,630 B1 | 10/2001 | Kurokawa et al. | |
| 7,063,924 B2 | 6/2006 | Kaminsky et al. | |
| 2003/0129385 A1* | 7/2003 | Hojo | B29D 17/005 428/323 |
| 2005/0089671 A1 | 4/2005 | Kubota | |
| 2006/0177631 A1* | 8/2006 | Paulson | B31D 1/025 428/131 |
| 2007/0058260 A1 | 3/2007 | Steenblik et al. | |
| 2008/0003420 A1 | 1/2008 | Condon et al. | |
| 2010/0151207 A1* | 6/2010 | Hansen | B44C 1/16 428/172 |
| 2011/0123766 A1* | 5/2011 | Sakagami | B32B 27/08 428/141 |
| 2012/0164419 A1* | 6/2012 | Sakagami | B32B 27/12 428/216 |
| 2013/0182300 A1 | 7/2013 | Muller et al. | |

FOREIGN PATENT DOCUMENTS

| | | |
|---|---|---|
| EP | 2660067 | 11/2013 |
| WO | 2013028534 | 2/2013 |

OTHER PUBLICATIONS

International Search Report and Written Opinion issued in the corresponding International Application No. PCT/US2015/053429, dated Dec. 21, 2015, 11 pages.

Office Action Issued in the corresponding Chinese patent application No. 201580053059.X, with English translation, dated Jan. 4, 2019, 18 pages.

\* cited by examiner

TOPCOAT WITH MATTE SURFACE FINISH

FIELD

Embodiments of this disclosure relate generally to topcoat supplies and topcoats that are usable on substrates such as personalized plastic card substrates, passport page substrates, and other substrates to protect underlying data from degradation, wear and the like.

BACKGROUND

Radiation curable topcoats have been used to protect documents such as plastic card substrates and other substrates. In some cases, a curable topcoat composition is applied directly to the substrate as a liquid and then cured by exposing the composition to radiation, such as ultraviolet (UV) radiation, to form a dry hard surface. In other cases, for example as described in U.S. Pat. No. 6,001,893 which is incorporated herein by reference in its entirety, a curable topcoat composition is applied to a base film first, dried so that it is substantially solvent free, applied to the substrate, and then exposed to appropriate radiation to bring about curing. In both cases, the cured topcoat provides protection to the document from common chemicals and abrasion, thereby extending the useful life of the document.

Known topcoats provide a transparent and glossy surface over the substrate. In some circumstances, a glossy surface finish is undesirable since it may show minor surface defects in the substrate such as scratches and scuff marks which may be considered to impart a visually displeasing appearance to the document. In addition, a glossy topcoat is easy to recreate after fraudulent alteration of the substrate making fraud detection difficult.

SUMMARY

This disclosure describes improvements to topcoats applied to substrates to protect underlying data on the substrate from degradation, wear, and the like. The topcoat provides a matte surface finish and can also provide evidence of tampering with the substrate and/or the topcoat. A matte surface finish provides what can be considered a pleasing appearance and hides surface defects such as scratches and scuff marks on the document or substrate resulting from wear during use and storage. In addition, tamper evidence can be useful to help detect fraudulent alteration of the substrate. Any attempt to remove the topcoat, in order to alter the information present on the substrate, will destroy the surface structure of the topcoat making it tamper evident.

In one embodiment described herein, the substrate is an identification document substrate such as a card substrate or a passport page substrate. Examples of card substrates include, but are not limited to, plastic card substrates (or similar card substrates formed from composite materials) that are intended during use to serve as identification cards, driver's licenses, financial cards (e.g., credit card, debit card), phone cards, health cards, or the like.

In the case of card substrates, the card substrates typically have printed matter applied thereto in the form of graphics and/or text. The printed matter is applied by a suitable printing process either directly onto the card substrate or by printing the matter onto an intermediate transfer material and then transferring the intermediate transfer material onto the card substrate. The printed matter is protected by the topcoat described herein.

In one embodiment, the printed matter that is applied to the card substrates can include variable data. Variable data is data that varies from card substrate to card substrate, with the data being specific to or assigned to the customer to whom the resulting card is to be issued. Examples of variable data can include, but are not limited to, account numbers, photos or images of the intended card holders, customer names, expiration dates and the like.

In another embodiment, the printed matter that is applied to the card substrates can also include fixed, static, or non-variable data (hereinafter referred to as non-variable data). Non-variable data is data that is not specific or assigned to the intended card holder and is instead common to a number of other card substrates. Examples of non-variable data can include, but are not limited to, company names, company logos, background graphics, and the like.

In another embodiment, the substrates are the data pages of passports with the data pages containing printed matter in the form of variable data that is specific to the intended passport holders and/or non-variable data.

In other embodiments, the substrates are any substrates having printed matter, such as images and/or text, applied thereto, that one wishes to protect from degradation using a topcoat described herein.

In one embodiment, a radiation curable topcoat material is coated onto a stable base film which is intentionally formed to have a surface structure with desired surface feature(s) or topography. The topcoat material is then dried to form a substantially solvent free coating on the base film. The coating can thereafter be transferred to the substrate using any suitable technique, for example using heat and pressure. Upon transfer to the substrate, the outer surface of the coating, which previously faced the surface of the base film having the intentionally formed topography, exhibits the surface structure of the base film in a reverse format. The transferred coating can then be cured with appropriate radiation to form a durable topcoat with an intentional, defined surface structure or topography.

The defined surface structure on the topcoat provides a matte surface finish to the underlying substrate. In addition, any attempt to alter the substrate or the topcoat will result in disruption or destruction of the surface structure of the topcoat making such tampering evident. Replication of the surface structure of the topcoat by a counterfeiter is also difficult without the appropriate base film or equipment for forming a coated base film.

The surface structure on the base film and the resulting topcoat can be considered to be optically visible both to the naked eye as well as under higher magnification such as using a loop, magnifying glass, microscope or other magnification means. The surface structure is visible to the naked eye in the form of the matte finish compared to the gloss finish of known topcoats. In another embodiment, the surface structure is visible to the naked eye when the surface structure is in the form of, for example, an emblem or seal that can be seen as a shape by the naked eye. In addition, the surface structure can be made up of unique shapes that are visible under magnification.

Therefore, on a macro scale, the resulting appearance of the topcoat is a result of the matte or decorative finish that is visible to the naked eye. The security or tamper evidence provided by the topcoat can be visible to the naked eye (for example, on a macro scale a large seal, pattern, images or other surface structures that are visible to the naked eye can be used) or be visible under magnification (for example, on a micro scale, smaller surface structures or shapes that are not visible to the naked eye can be used).

In some embodiments, macro scale surface structures that are visible to the naked eye, as well as micro scale surface structures that are not visible to the naked eye but are visible under magnification, can be used. Any combinations of macro and micro scale surface structures can be used. For example, a micro scale surface structure can be formed within a macro scale surface structure so that the micro scale surface structure is hidden by the macro scale surface structure which provides enhanced security since one must know where to look on the macro scale surface structure using magnification in order to see the micro scale surface structure, and replication of a topcoat with a micro scale surface structure within a macro scale surface structure is difficult. In another example, a micro scale surface structure can be formed on the topcoat at a location separate from a macro scale surface structure.

DETAILED DESCRIPTION

Figure 1:
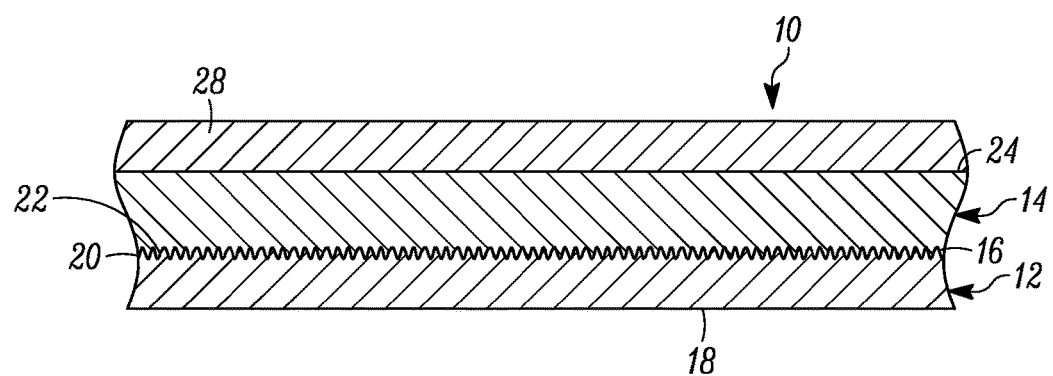
FIG. 1 is a cross-sectional view of one embodiment of a topcoat film supply described herein.

The following description is directed towards topcoats applied to substrates to protect printed matter on the substrates from degradation, wear, and the like. The topcoat is formed with a surface structure that provides a matte surface finish and can provide evidence of tampering with the substrate and/or the topcoat. A matte surface finish provides what can be considered a pleasing appearance and hides surface defects such as scratches and scuff marks on the resulting document or substrate resulting from wear during use and storage. In addition, any attempt to remove the topcoat, in order to alter the information present on the substrate, will destroy the surface structure of the topcoat thereby providing evidence of tampering.

The substrate can be any substrate having printed matter or data, such as images, graphics and/or text, applied thereto, for example by printing, that one may wish to protect from degradation and wear using a topcoat described herein. In one embodiment described further below, the substrate can be an identification card substrate. Examples of identification card substrates include, but are not limited to, plastic card substrates (or similar card substrates formed from composite materials) that are intended during use to serve as identification cards, driver's licenses, financial cards (e.g., credit card, debit card), phone cards, health cards, or the like. In another embodiment, the substrate can be a data page of a passport. Identification cards and passports can be collectively referred to as identification documents.

In one embodiment, a radiation curable topcoat composition is coated onto a base film which is intentionally formed to have a surface structure with desired surface feature(s) or topography. As used herein, surface features or topography may also be referred to as bumps, raised areas, elevations, ridges, lands, grooves, valleys, and the like. The surface feature(s) are intentionally created on the base film for subsequent formation on the surface of the topcoat layer that is coated onto the base film. The surface feature(s) can have a minimum roughness. These intentionally formed surface feature(s) are intended to be different than and distinct from any residual roughness on a standard base film that may be inherently present due to manufacturing limitations of the base film.

After being coated onto the base film, the topcoat material is then dried by evaporation of the solvent to form a substantially solvent free coating on the base film. In some embodiments, an optional cover film can be provided over the topcoat material. The coating can thereafter be transferred to the substrate using any suitable technique, for example using heat and pressure. Upon transfer to the substrate, the outer surface of the coating, which previously faced the surface of the base film having the intentionally formed surface feature(s), exhibits the surface structure of the base film in a reverse format. The transferred coating can then be cured with appropriate radiation to form a durable topcoat with an intentional, defined surface structure or topography.

On a macro scale, the surface structure is visible to the naked eye in the form of the matte finish compared to the gloss finish of known topcoats. In another embodiment, the surface structure is visible to the naked eye when the surface structure is in the form of, for example, an emblem or seal that can be seen as a shape on the topcoat by the naked eye. In addition, the surface structure can be made up of unique shapes that are visible under magnification.

The security or tamper evidence provided by the topcoat can be visible to the naked eye (for example, on a macro scale a large seal, pattern, images or other surface structures that are visible to the naked eye can be used) or be visible under magnification (for example, on a micro scale, smaller surface structures or shapes that are not visible to the naked eye can be used). In some embodiments, both macro scale surface structures that are visible to the naked eye, as well as micro scale surface structures that are not visible to the naked eye but are visible under magnification can be used.

Topcoat Film Supply

With reference to FIG. 1, in one embodiment, a topcoat film supply 10 includes in general a base film 12 and a topcoat layer or coating 14. The base film 12 has a first surface 16 and a second surface 18 opposite the first surface 16. The first surface is intentionally formed to have a surface structure 20 with a desired topography so that the first surface 16 intentionally deviates from being smooth.

The topcoat layer 14 is a substantially solvent free, transferrable, radiation curable coating that is disposed on the first surface 16 of the base film 12. The topcoat layer 14 has a first or inner surface 22 that faces the first surface 16 and a second or outer surface 24. The first surface 22 has a surface structure 26 (best seen generally in FIG. 4) that matches, but is the reverse of, the surface structure 20 of the first surface 16. As discussed further below with respect to FIG. 4, the topcoat layer 14 is designed to be transferred to a surface of a substrate 30 with the second surface 24 thereof facing the substrate 30 and the first surface 22 thereof facing outwardly away from the substrate 30 so that the surface structure 26 thereof faces outwardly away from the substrate.

In some embodiments, the topcoat film supply 10 can include one or more of a release coat or release layer or a cover film. In one embodiment, a release coat or layer can be applied between the first surface 16 of the base film 12 and the inner surface 22 of the topcoat layer 14 to facilitate release of the topcoat layer 14 from the base film 12 during transfer to the substrate.

In another embodiment, a release coat or layer can be applied on the second surface 18 of the base film 12. The release coat or layer on the surface 18 is useful to prevent sticking if the film supply 10 is rolled onto itself when the supply 10 is in roll form or if stacked with other film supply sheets if the film supply 10 is in sheet form.

In another embodiment, a cover film can be used. The embodiment in FIG. 1 illustrates an optional cover film 28 disposed over the second surface 24 of the topcoat layer 14. The cover film 28, if used, helps prevent sticking if the film supply 10 is rolled onto itself if the supply 10 is in roll form or if stacked with other film supply sheets if the film supply 10 is in sheet form. The cover film 28 also prevents dirt and contaminants from sticking to the topcoat 14 prior to use, for example during storage, transport, etc. The cover film 28, if used, is removable from the topcoat layer 14 prior to transferring the topcoat layer 14 to the substrate 30.

Figure 2:
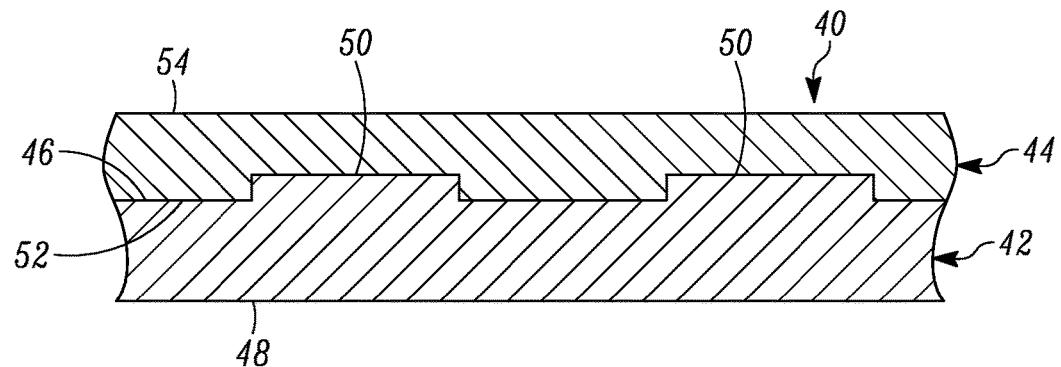
FIG. 2 is a cross-sectional view of another embodiment of a topcoat film supply described herein.

FIG. 2 illustrates another example of a topcoat film supply 40 that includes in general a base film 42 and a topcoat layer or coating 44. In this embodiment, the cover film 28 illustrated in FIG. 1 is not present. The base film 42 has a first surface 46 and a second surface 48 opposite the first surface 46. A release coat or layer as described above can be provided on the second surface 48 of the base film 42 if desired and/or a release coat can be provided between the base film 42 and the topcoat layer 44. The first surface 46 is intentionally formed to have a surface structure 50 with a desired topography so that the first surface 46 intentionally deviates from being smooth.

The topcoat layer 44 is a substantially solvent free, transferrable, radiation curable coating that is disposed on the first surface 46 of the base film 42. The topcoat layer 44 has a first or inner surface 52 that faces the first surface 46 and a second or outer surface 54. The first surface 52 has a surface structure 56 (see FIG. 4) that matches, but is the reverse of, the surface structure 50 of the first surface 46.

Base Film Construction

Each of the base films described herein function as a carrier for the described topcoat layer and as a protective layer to the topcoat layer, while the topcoat film supply is stored. The base film can be made from any material that adequately separates from the topcoat layer during application of the topcoat layer to the substrate. The base film should also maintain its structural integrity and physical properties during application of the topcoat layer and under storage conditions.

The base film can be any thermally and chemically stable polymeric film including, but not limited to, polyester, polycarbonate, polypropylene, polyamide, polyimide, Teflon, acrylic, vinyl, and the like. The base film can be in a roll or sheet format.

The base film thickness can be selected to achieve its carrier and protection functions. In one embodiment, the base film can have a thickness of between about 4 microns to about 400 microns. In another embodiment, the base film has a thickness of between about 5 microns to about 200 microns. In another embodiment, the base film can have a thickness of between about 10 microns to about 100 microns. In still another embodiment, the base film can have a thickness of between about 12 microns to about 25 microns.

As described above, the first surface of the base film is intentionally formed to have a surface structure so that the first surface intentionally deviates from being smooth. The surface structure can take on any form that is suitable for achieving either or both of the matte surface finish and tamper evident security functions described herein. The surface structure can take many forms including, but not limited to, random roughness, pre-defined shapes, custom shapes, designs, logos, images, alphanumeric characters, symbols, and the like. Any combinations of surface structure forms can be used together.

Substantially the entire surface area of the first surface of the base film can be formed with the surface structure(s) (generally as illustrated in FIG. 1) or only a portion of the surface area of the first surface can be provided with the surface structure(s) (generally as illustrated in FIG. 2).

The surface structure that is used will have an average projecting roughness (Ra) measured from peak to valley. The average roughness can be measured using any suitable measuring technique known in the art. For example, a Mitutoyo Model SJ-410 Surface Roughness Measuring Tester with a 2 micrometer stylus can be used. Non-contact measuring techniques can be used as well.

The average roughness will depend on, for example, the thickness of the topcoat layer. In general, the thicker the topcoat layer, the greater the average roughness can be. In one embodiment, the maximum surface structure roughness should be less than about 75% of the topcoat layer thickness. The use of larger average roughness may result in excessive loss of protection provided by the topcoat once it is transferred to the substrate.

In one embodiment, the average surface structure roughness (Ra) is at least about 0.15 micron. In another embodiment, the average surface structure roughness (Ra) is between about 0.15 to about 5 microns. In another embodiment, the average surface structure roughness (Ra) is between about 0.3 to about 3 microns. In another embodiment, the average surface structure roughness (Ra) is between about 0.4 to about 1.5 microns. Known base films, such as the base film disclosed in U.S. Pat. No. 6,001,893, have an average surface roughness that is below 0.1 micron.

The surface structure can be formed on the base film in any suitable manner. For example, the surface structure can be embossed onto the surface of the base film with heat and/or pressure, etched onto the surface of the base film with chemical or laser treatment, deposited onto the surface of the base film by a process such as printing, coating, spraying, hot stamping, vapor deposition or electro-deposition. If deposition is used, the deposited surface structure could be polymeric, resins, UV or radiation cured coatings or inks, metal or metal compounds (in the case of vapor deposition).

In one embodiment, the surface structure is formed by random roughness over the majority, for example substantially the entirety, of the first surface of the base film. In such a case, the base film can be formed by a material such as Mylar EB11, available from DuPont Corporation, that has a surface with a measured average roughness of about 0.8 micron, or formed by a material such as Melinex 377, available from DuPont Corporation, that has a surface with an average roughness of about 0.4 microns.

Other examples of suitable base films that can be used include:
Hostaphan Matte Film, MTB1; Medium Gloss
Hostaphan Matte Film, MPK; Low gloss, high transparency
Hostaphan Matte Film, MKK; Low gloss Hostaphan Matte Film, SLK; Very low gloss, high roughness each of which is available from Mitsubishi Polyester Film, Inc. of Greer, S.C.

In another embodiment, the surface structure(s) can be in the form of one or more defined shapes. In such a case, the base film can be formed by an embossed polyester film having diamond or hexpin shapes available from C. E. Shepherd Company.

In another embodiment, the surface structure(s) can be in the form of custom shapes, designs, logos, images, alphanumeric characters, symbols, and the like created by one of the processes listed above.

Figure 3:
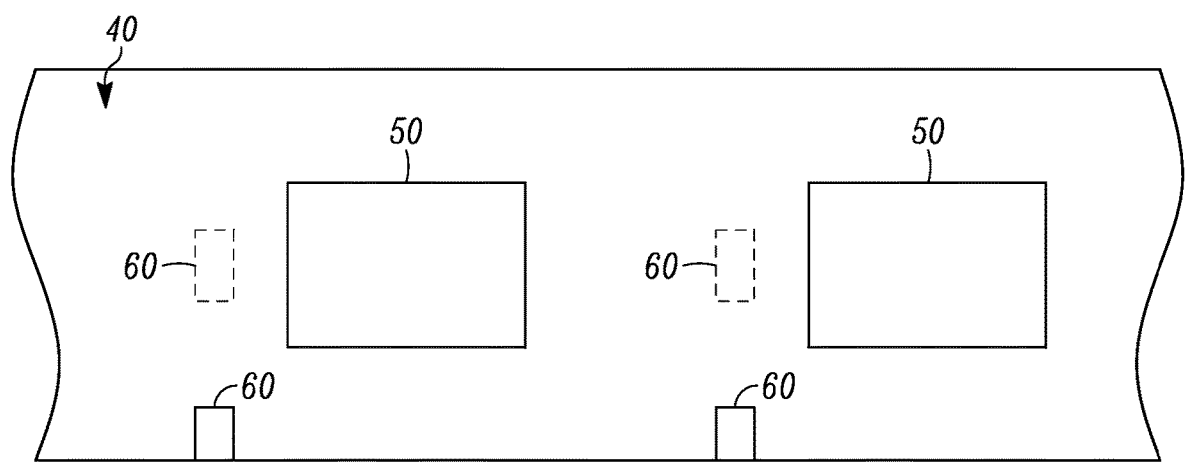
FIG. 3 is a top view of a portion of another embodiment of a topcoat film supply described herein.

When the surface structure is in a defined or custom shape, design, logo, image, alphanumeric characters, symbols, or the like, it may be desirable to precisely register the location of the base film relative to the substrate during transfer so that the topcoat layer with the corresponding surface structure is located at a desired position on the substrate. To aid in registration, registration marks 60 (visible in FIG. 3) can be added to the base film to register the surface structure location on the substrate. The registration marks can take any form suitable for achieving the registration function. For example, the registration marks 60 can include, but are not limited to, printed marks on the base film (as seen in FIG. 3), one or more holes in the film (as seen in FIG. 3), changes in the transmission density of the base film, changes in the reflectivity of the base film, and the like.

In one embodiment, the base film can have a surface structure with an average roughness from about 0.3 to about 3 microns.

In another embodiment, the base film can comprise an embossed polyester film.

In another embodiment, the base film can include an embossed design as the surface structure, where the embossed design is visible to the naked eye. In another embodiment, the embossed design can also include a design element as a surface structure that is only visible under magnification.

Topcoat Layer Construction

Each of the topcoat layers described herein are transferrable from the base film of the topcoat film supply onto the substrate. Once the topcoat layer is transferred, the topcoat layer is exposed to suitable radiation to cure the topcoat layer.

The topcoat layer is formed by coating a fluid or viscous topcoat material onto the base film. The topcoat material is then dried to remove solvent and form a substantially solvent free coating on the base film. The first surface of the resulting topcoat layer will have a surface structure that is the mirror of the surface structure on the base film.

In one embodiment, the topcoat material can be a radiation curable mixture that includes a thermoplastic polymer, a radiation curable monomer or oligomer, a photoinitiator, and a nonreactive solvent. The mixture is then applied to the base film using suitable application techniques. The applied mixture is then dried to remove the nonreactive solvent to form a substantially solvent free coating.

In one embodiment, the topcoat material can have a composition, and can be applied to and formed on the base film, as disclosed in U.S. Pat. No. 6,001,893 the entire contents of which are incorporated herein by reference.

One example of a suitable topcoat composition that can be used to form the topcoat layer includes a polymerizable composition with hard and flexible polymerizable subunits, where the hard subunit comprises alkoxylated trimethylolpropane triacrylate with a degree of alkoxylation ranging from about 1 to about 10; the flexible subunit comprises alkoxylated trimethylolpropane triacrylate with a degree of alkoxylation ranging from about 10 to about 20; and the ratio (by weight) of hard to flexible subunits in the composition is from about 1.5:1 to about 4:1. The topcoat composition can also include a polymeric binder. The topcoat composition is substantially plasticizer free and the ratio by weight of the polymerizable composition to polymeric binder is between 0.75:1 and 1.50:1 inclusive.

In one embodiment, the radiation curable composition can be substantially plasticizer free and the ratio by weight of the polymerizable composition to polymeric binder can be between 0.75:1 and 1.50:1 inclusive.

In another embodiment, the radiation curable composition can include a polymerization initiator.

In another embodiment, the radiation curable composition can include a chain transfer agent that can be, for example, 2-mercapto benzoxazole.

In one embodiment, the topcoat material can be applied in a manner so as to form a continuous topcoat layer on the base film. In another embodiment, the topcoat material can be applied in a manner so as to form discrete, separate, spaced topcoat patches on the base film.

Optional Cover Film Construction

If a cover film is used, the cover film can be constructed and operate similar to the cover film(s) disclosed in U.S. Pat. No. 6,001,893 the entire contents of which are incorporated herein by reference.

Optional Release Layer

If a release layer is used, the release layer can be constructed and operate similar to the release layer(s) disclosed in U.S. Pat. No. 6,001,893 the entire contents of which are incorporated herein by reference.

Transfer of Topcoat Layer to Substrate

Figure 4:
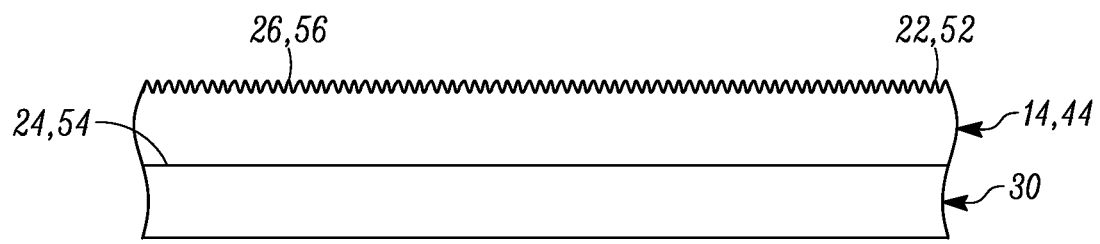
FIG. 4 is a cross-sectional view of one embodiment of a substrate with a topcoat layer applied thereto.

FIG. 4 illustrates the topcoat layer transferred onto the substrate 30. The topcoat layer can cover a portion or the entire surface area of the substrate. FIG. 4 illustrates the topcoat layer covering the entire surface area. The topcoat layer is transferred from the base film of the film supply to the substrate using one or both of heat and pressure. The topcoat layer can be transferred to the substrate using any of the techniques disclosed in U.S. Pat. No. 6,001,893 the entire contents of which are incorporated herein by reference.

As discussed above, if the surface structure of the topcoat layer needs to be located at a particular position over the substrate, the registration marks 60 on the base film can be used to help register or position the base film, and therefore the topcoat layer and the accompanying surface structure, relative to the substrate so that the surface structure is located at the proper position once the topcoat layer is transferred. The use of registration marks to register a web that carries a transferrable material to be transferred onto a substrate is disclosed in U.S. Patent Application Publication No. 2006/0177631 and U.S. Pat. Nos. 6,030,474 and 6,308,630, each of which is incorporated herein by reference in its entirety.

Once transferred, the topcoat layer protects the underlying substrate and printed matter thereon from common chemicals and abrasion, thereby extending the useful life of the document.

Example Substrate

Figure 5:
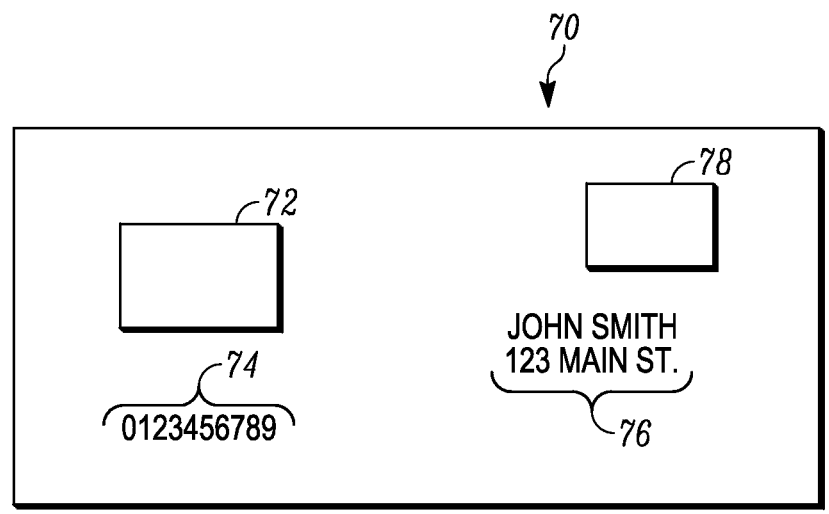
FIG. 5 is a top view of an embodiment of an identification document in the form of an identification card that can be provided with the topcoat layer described herein.

FIG. 5 illustrates an example of a substrate that can benefit from the topcoat layers described herein. In this example, the substrate is in the form of an identification card substrate 70, such as a plastic card substrate (or a similar card substrate formed from composite materials) that is intended during use to serve as an identification card, a driver's license, a financial card (e.g., credit card, debit card), a phone card, a health card, or the like. The identification card substrate can have printed matter applied thereto, for example variable and/or non-variable printed matter, in the form of graphics and/or text that it is desirable to protect using the topcoat layer described herein. The printed matter can be applied by a suitable printing process either directly onto the card substrate or by printing onto an intermediate transfer material and then transferring the intermediate transfer material onto the card substrate. In the example illustrated in FIG. 5, the printed matter can include one or more of a photograph 72 of the intended card holder, an account number 74 that is assigned to the card holder, a name and address 76 of the card holder, and other variable personalization data well known in the art. In addition, non-variable material 78 (i.e. material that is not specific or assigned to the card holder and is instead common to a number of other card substrates), such as a company logo, company name, background graphics or a security feature such as a hologram, can be provided on the card substrate 70 and be protected by the topcoat layer.

Example Process

An example process based on the preceding description is as follows. A thermally and chemically stable base film with the desired surface structure is provided. The surface structure on the base film should be in a negative or reverse format with reference to the ultimate desired surface structure on the topcoat layer that is applied to the substrate.

Next, a curable topcoat composition is applied to the side of the base film having the desired surface structure. The applied topcoat composition is then dried to remove solvent and form a substantially solvent free curable topcoat layer on the base film.

The curable topcoat layer is then laminated to the desired surface of the substrate that one wishes to protect. The top surface of the topcoat layer will have the desired surface texture.

The topcoat layer is then exposed to appropriate radiation, for example UV radiation, to bring about sufficient curing of the curable topcoat layer.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

The invention claimed is:

1. A topcoat film supply that includes a transferrable radiation curable coating to be applied to a surface of a plastic card substrate, comprising:

a base film having a first surface, the first surface is intentionally formed to have a surface structure with a desired topography having an average surface roughness $R_a$ of at least about 0.15 micron; and the transferrable radiation curable coating is disposed on the first surface of the base film, the transferrable radiation curable coating is not in a cured state while on the base film, the transferrable radiation curable coating having an inner surface facing the first surface, the inner surface has a surface structure that is a mirror image of the surface structure of the first surface;

the transferrable radiation curable coating includes:

(a) a polymerizable composition comprising hard and flexible polymerizable subunits, wherein (i) the hard subunit comprises alkoxylated trimethylolpropane triacrylate with a degree of alkoxylation ranging from about 1 to about 10; (ii) the flexible subunit comprises alkoxylated trimethylolpropane triacrylate with a degree of alkoxylation ranging from about 10 to about 20; and (iii) the ratio (by weight) of hard to flexible subunits in the composition is from about 1.5:1 to about 4:1; and (b) polymeric binder.

2. The topcoat film supply of claim 1, further comprising registration marks on the base film.

3. The topcoat film supply of claim 1, wherein the topcoat film supply is in roll form or in sheet form.

4. The topcoat film supply of claim 1, wherein the average surface roughness $R_a$ is less than about 75% of a thickness of the transferrable radiation curable coating.

5. A topcoat film supply that includes a transferrable radiation curable composition to be applied to a surface of a plastic card substrate, comprising:

a base film having a first surface, the first surface having a surface structure with an average surface roughness $R_a$ of at least about 0.15 micron; and the transferrable radiation curable composition disposed on the first surface of the base film, the transferrable radiation curable composition is not in a cured state while on the base film, the transferrable radiation curable composition comprising:

(a) polymerizable composition comprising hard and flexible polymerizable subunits, wherein (i) the hard subunit comprises alkoxylated trimethylolpropane triacrylate with a degree of alkoxylation ranging from about 1 to about 10; (ii) the flexible subunit comprises alkoxylated trimethylolpropane triacrylate with a degree of alkoxylation ranging from about 10 to about 20; and (iii) the ratio (by weight) of hard to flexible subunits in the composition is from about 1.5:1 to about 4:1; and (b) a polymeric binder.

6. The topcoat film supply of claim 5, wherein the transferrable radiation curable composition is substantially plasticizer free and wherein the ratio by weight of the polymerizable composition to polymeric binder is between 0.75:1 and 1.50:1 inclusive.

7. The topcoat film supply of claim 5, wherein the transferrable radiation curable composition further comprises a polymerization initiator.

8. The topcoat film supply of claim 5, wherein the transferrable radiation curable composition further comprises a chain transfer agent.

9. The topcoat film supply of claim 8, wherein the chain transfer agent comprises 2-mercapto benzoxazole.

10. The topcoat film supply of claim 5, wherein the base film has a surface structure with an average surface roughness $R_a$ from about 0.3 to about 3 microns.

11. The topcoat film supply of claim 5, wherein the base film comprises an embossed polyester film.

12. The topcoat film supply of claim 5, wherein the base film contains an embossed design that is visible to the naked eye.

13. The topcoat film supply of claim 12, wherein the embossed design includes a design element that is only visible under magnification.

* * * * *